June 12, 1962 L. J. FULLER 3,038,308
GAS TURBINE COMBUSTION CHAMBER AND METHOD
Filed July 16, 1956 2 Sheets-Sheet 1

INVENTOR
LAWRENCE J. FULLER
BY
ATTORNEYS

INVENTOR
LAWRENCE J. FULLER
BY
ATTORNEYS ns Patent Office
3,038,308
Patented June 12, 1962

3,038,308
GAS TURBINE COMBUSTION CHAMBER
AND METHOD
Lawrence J. Fuller, Norristown, Pa.; Nancy W. N. Fuller and The Philadelphia National Bank, executors of the estate of said Lawrence J. Fuller, deceased
Filed July 16, 1956, Ser. No. 597,991
3 Claims. (Cl. 60—39.55)

The present invention relates to gas turbines and methods of operating the same, and is concerned particularly with the combustion chamber or source of heat and the design of the surrounding equipment. When reference is made herein to a gas turbine, it is intended to include not only those engines which are commonly called gas turbines, but also to include similar engines which are sometimes designated as jet engines, turbo-jet engines, turbo-prop engines, or rotary engines.

The present invention relates to improvements in gas turbines which produce increased efficiency by utilizing waste heat and by cooling the environment of the source of heat. In the case of the usual gas turbine, the invention contemplates cooling the liner of the combustion chamber and the products of combustion in the combustion chamber without the need for compressed air substantially in addition to that required for combustion.

The invention can be applied to any rotary engine utilizing products of combustion or other heated gases which are in motion to produce power by rotating a turbine wheel, or by jet propulsion, or by a combination thereof.

Gas turbines, and similar engines, are extremely wasteful because of the large amount of heat carried to the atmosphere by the exhaust gases. It is possible to increase the efficiency of such engines greatly if this heat is turned into useful energy.

Extensive efforts have been made in the prior art to utilize this lost energy. One of the methods attempted is to heat water by the heat in the exhaust gases and then spray the hot water directly into the highly heated products of combustion, hoping to accomplish vaporization of the water to produce additional gas in the combustion chamber, and also hoping to reduce the temperature of the products of combustion to prevent damage to metallic parts of the equipment.

The results hoped for by spraying water into the hot gases in the combustion chamber have not materialized, and very little commercial use has been made of this method. The difficulty encountered is belived to be due in part to the high speed of the gases in the combustion chamber, which makes effective heat transfer to vaporize liquid water within the combustion chamber impractical. The presence of liquid water introduced in the combustion chamber also has a tendency to cause a "flame-out."

In accordance with the present invention, the operation of the gas turbine or similar engine is improved by utilizing heat in the exhaust gases, and at the same time metallic parts of the equipment are protected against excessive temperatures. The difficulties of the previous method of spraying water directly into the hot products of combustion as they pass through the combustion chamber are avoided. In accordance with the present invention, an annular cooling and vaporizing zone is provided around the combustion chamber or other source of heat. Liquid water, preferably suitably preheated as later explained, is introduced into the cooling and vaporizing zone and caused to vaporize in that zone, being confluently introduced into the gas stream heated by the source of heat after vaporization is complete. Thus, the difficulties previously encountered through introduction of liquid water directly in the interior of the combustion chamber at the point of combustion are avoided.

In prior art gas turbines, it has been necessary to introduce a relatively large amount of compressed air in addition to that required for combustion, in order that the additional air might lower the temperature of the products of combustion and protect the equipment and particularly the lining of the combustion chamber from excessive temperature. The compression of this large amount of additional air utilizes a substantial amount of the energy developed by the turbine, and accordingly reduces the efficiency. In accordance with the present invention, it is no longer necessary to introduce additional air merely for the purpose of cooling the products of combustion, and accordingly the quantity of air compressed can be reduced to that required for most efficient combustion.

In the preferred embodiment of the invention, the thermodynamic efficiency of the gas turbine or similar engine is increased by capturing the lost heat from the exhaust gases and other sources of heat loss by transfer to water and to a suitable high temperature transfer medium which is circulated through the combustion chamber casing jacket. This water, after heating to a temperature close to the temperature of vaporization, is introduced into the combustion chamber between the liner and the heated combustion chamber casing, where it is converted into steam. The latent heat of vaporization of the water which is vaporized has a pronounced cooling effect on the combustion chamber liner which surrounds the combustion zone and which would be burned up if not properly cooled. Thus, according to the present invention, I substitute for cooling of the liner by compressed air, a cooling technique using vaporized water which is introduced outside the liner. By the vaporization of the water, steam is generated which mixes with the heated gases (usually products of combustion) cooling them before they enter the turbine, and thus protecting the turbine, while augmenting the quantity of gas passing through the turbine.

Instead of water, a mixture of water and ethyl or methyl alcohol, or ethyl or methyl alcohol alone may be used if preferred.

Thus, it will be noted, as already mentioned, that it is no longer necessary for the air compressor to handle a large volume of air in excess of that employed for burning the fuel, thus eliminating from the operation of the turbine a large amount of air previously compressed for cooling the combustion chamber liner and the products of combustion so as to protect the metallic parts.

Further features of the invention and further advantages will be evident from reading the detailed description in the light of the attached drawings.

Figure 1:
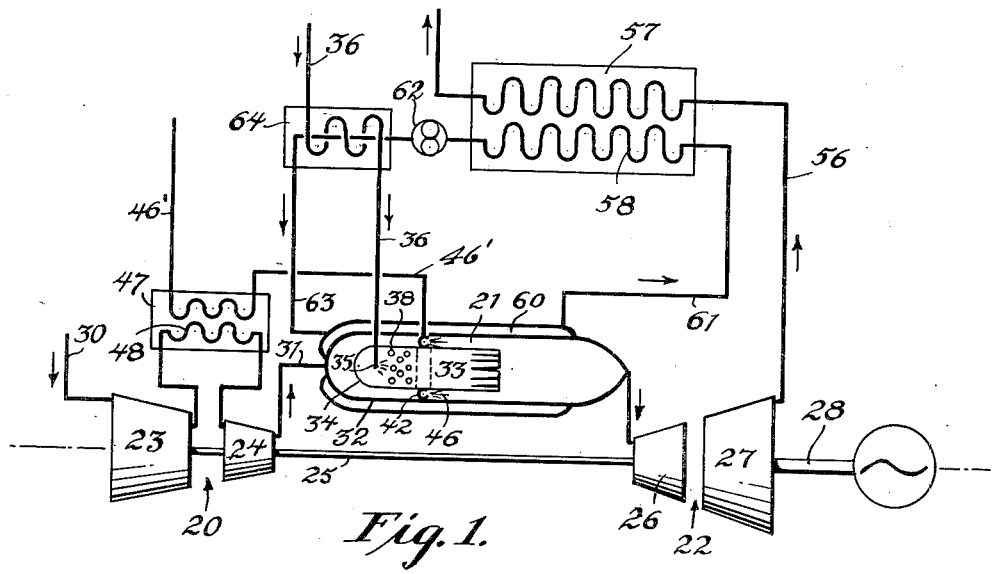
FIGURE 1 is a diagram of a gas turbine embodying the principles of the invention.
Figure 2:
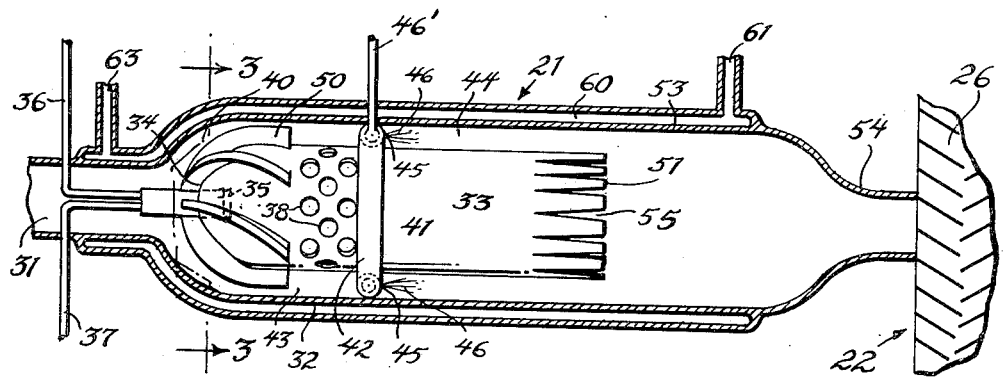
FIGURE 2 is an enlarged diagrammatic axial section of a combustion chamber of the gas turbine of FIGURE 1.
Figure 3:
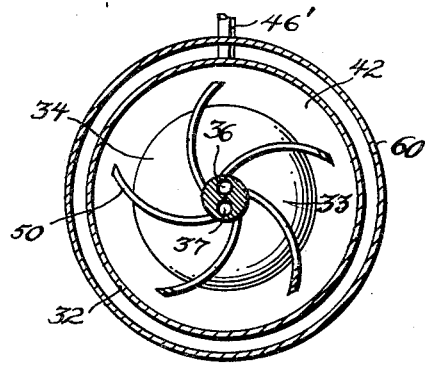
FIGURE 3 is a section of FIGURE 2 on the line 3—3.

Considering first the form of FIGURES 1 to 3 inclusive, I there illustrate a gas turbine having a compressor 20, a combustion chamber 21, and a turbine 22 which can suitably be of any well known type. In the form shown, the compressor has two stages 23 and 24 including rotors mounted on the shaft 25 and driven by turbine stage 26. The turbine has a power stage 27 which is connected to the output shaft 28 and of course is not connected to the compressor shaft 25. For convenience in illustration in FIGURE 1, the combustion chamber has been located to the side of the shaft 25, although it will be evident as well known in the art, the combustion chamber 21 shown is only one of a number of combustion chambers which are grouped around the axis as well known.

It will be evident that the particular form of the combustion chamber is unimportant in the present invention, and it may, if desired, be of annular or other form rather than cylindrical as illustrated.

Air enters the compressor at 30 and leaves the compressor through duct 31 to enter the combustion chamber casing 32 which contains a combustion chamber liner 33 spaced from the casing. The liner is supported in any suitable way as well known in the art in spaced relation from the surrounding casing. The liner at the upstream end has a closed dome portion 34 provided with an opening through which passes the fuel nozzle 35 connected by pipe 36 to a source of fuel and by pipe 37 to a source of atomizing air. The liner at the side wall beyond the nozzle 35 is provided with lateral openings 38 which permit combustion air, entering by the duct 31 and flowing around the space 40 at the upstream end of the liner, to enter the interior of the liner and support combustion.

The liner 33 surrounding the combustion zone 41 is exposed to the full heat of combustion and must be cooled.

In accordance with the present invention, the annular space outside the liner 33 and within the casing 32, is divided by a ring 42, so that the space 43 upstream with respect to the ring 42 is an air space carrying combustion air into the combustion chamber, while the space 44 downstream with respect to the ring 42 is a liquid coolant and vaporizing zone. Thus the portion of the liner upstream with respect to the ring 42 is cooled by the compressed air flowing around the liner and through the holes 38, while the portion downstream of the ring 42 is cooled by the latent heat of vaporization of the liquid coolant, preferably water.

The ring 42 has on its downstream side a group of spray openings 45 extending all around the ring, through which jets of coolant liquid 46 are discharged against the walls both of the casing and of the liner. The coolant liquid in the form of FIGURES 1 to 3 is supplied to the ring 42 through pipe 46' which extends through a heat exchanger 47 having a separate set of passages 48 which are carrying compressed air between the compressor stages 23 and 24 after the manner of an intercooler. Supplemental intercoolers can be provided as desired.

To assist in heat exchange between the upstream end of the liner and the air entering through passage 31, I preferably provide fins 50 which extend radially or in any other desired direction over the upstream closed end of the liner, and preferably spiral as shown to insure intimate contact of the air with the liner so as to most effectively dissipate heat of the liner at that point and also most effectively heat the entering air.

Combustion takes place in the combustion chamber with considerable violence or detonation in many cases, and the stream of highly heated gases discharges at the rear or downstream end 51 of the liner. The liquid coolant passing through the annular space 44 toward the downstream end of the liner rapidly absorbs heat from the liner and the casing, and is vaporized, so that by the time that it reaches the downstream end of the liner, all liquid has been vaporized and vapor (steam) at a temperature much below the temperature of the combustion gases discharges like an envelope around the combustion gases and sweeps along adjacent to the downstream casing walls 53, tending to protect the downstream end of the combustion chamber and the turbine nozzles 54 which direct the stream of heated gases into the turbine 22. The downstream end of the liner has a series of slots 55 suitably of sawtooth form to promote turbulence and aid in mixing of the surrounding vapor coolant envelope with the interior stream of highly heated gases.

An important feature of the present invention is that the coolant vapor stream and the highly heated gas stream are moving generally in the same direction or confluently at the time they join, so that the introduction of the coolant vapor stream does not represent a loss in energy.

In the preferred embodiment of the invention, the exhaust gases are withdrawn through the exhaust duct 56 and pass through a heat exchanger 57 which has a separate set of passages 58 which receive a high temperature heat transfer medium which is circulated from jacket 60 in the wall of the combustion chamber casing through pipe 61 to the heat exchanger passages 58 and then through pump 62 and pipe 63 returning to the jacket of the combustion chamber casing. The fuel being introduced is desirably preheated by the heat exchanger 64 and it passes in heat transfer relation with the medium returning through pipe 63. Since the temperature of the exhaust gases is relatively high, it is preferable to employ a heat transfer medium having a higher boiling point than water, suitable examples being diphenyl (Dowtherm), liquid metal such as magnesium, or the like.

The heat supplied by the preheater 47, preferably heats the liquid coolant to a temperature which is substantially the temperature of vaporization, so that it is not necessary to supply additional sensible heat when the coolant is sprayed into the coolant space 44. Thus the relatively large heat of vaporization is absorbed by the coolant liquid immediately upon entering into the coolant and vaporizing space 44, resulting in very effective cooling of the liner and also providing a relatively low temperature vapor which can effectively cool the down stream portion of the casing, the turbine, and the exhaust passages, reducing the overall temperature of the hot gases.

In operation it will be evident that the gas turbine of FIGURES 1 to 3 functions in the usual way except that its efficiency is greatly increased and the danger of destruction of metallic parts is reduced. Thus air is compressed in the usual way, but the quantity of air required is much reduced, since it is not necessary to introduce large quantities of excess air to cool the combustion chamber and to cool the liner. Also the air introduced in smaller volume can be compressed to higher pressures. The air for combustion enters around the upstream end of the liner and preferably cools the liner by heat transfer from the liner itself and particularly from the fins 50. The air then passes into the interior space of the liner and encounters the fuel from the jets 35, supporting combustion and discharging hot gases at the downstream end. In the meantime, coolant liquid, suitably water or the like, desirably preheated in the heater or heat transfer mechanism 47 to a temperature substantially that of vaporization, discharges through the jets 46 into the cooling and vaporizing space 44 around the liner, and is there vaporized, absorbing the latent heat of vaporization, and discharging a stream of relatively cool vapor which confluently joins with and surrounds the stream of highly heated combustion gases. Intermixture of the streams is promoted by the jagged downstream end of the liner. The efficiency of the device is promoted by the removal of heat from the exhaust gases in the heat exchanger 57 and return of this heat to the jacket which surrounds the casing of the combustion chamber.

Figure 4:
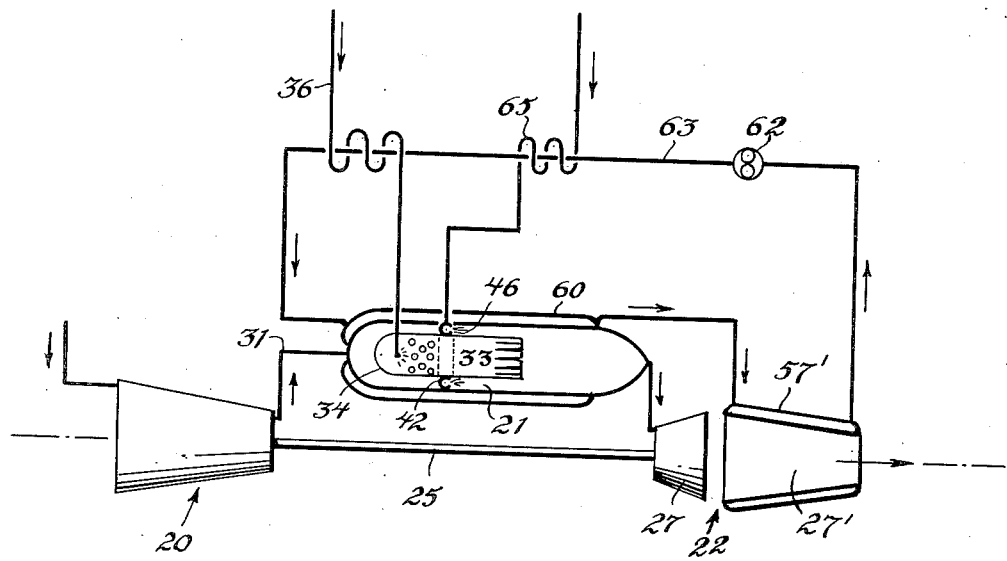
FIGURE 4 is a diagram similar to FIGURE 1 showing a modified gas turbine in accordance with the invention.

The form of FIGURE 4 illustrates a modification of the construction of FIGURES 1 to 3. In the form of FIGURE 4 the intercooler 47 is eliminated, and the liquid coolant is preheated by a preheater 65 which is in heat transfer relation with a separate passage through which the high temperature heat transfer medium is flowing in the pipe 63.

Also the form of FIGURE 4 differs from that of FIGURES 1 to 3 in that it shows a turbo jet engine including a turbine 27 operating the compressor 20 and a jet 27' which has a jacket 57' around the tail cone 27' and heats the high temperature heat transfer medium in the same way that was accomplished by the heat exchanger 57 illustrated in FIGURE 1.

Figure 5:
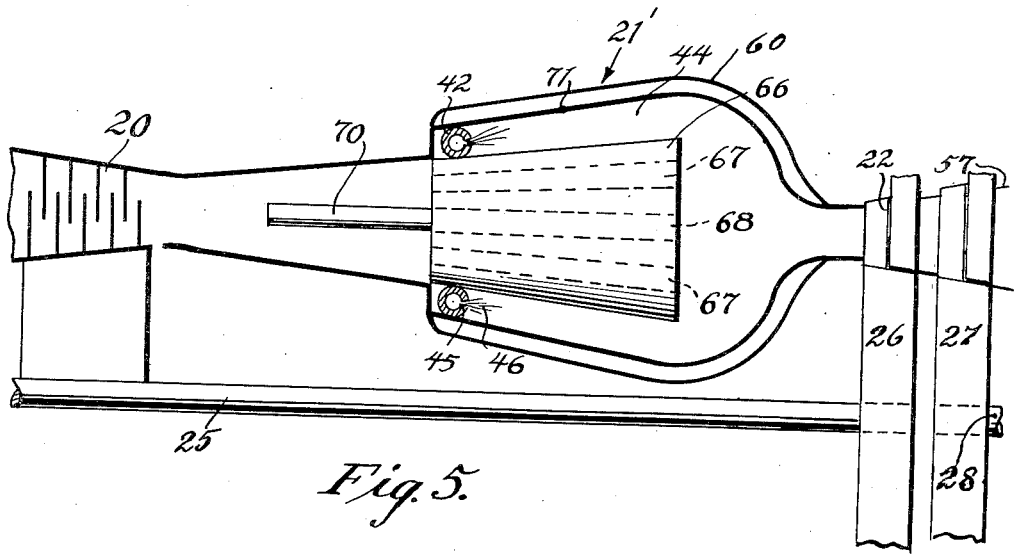
FIGURE 5 is a diagrammatic axial section of an atomic power installation embodying the principles of the invention.

While I have heretofore described the development of heat by combustion, it will be evident that any other suitable source of heat may be used including an atomic energy source as indicated diagrammatically in FIGURE 5. This differs from the construction of FIGURES 1 to 3 and of FIGURE 4 in that it is not necessary to introduce fuel as such for combustion. Air is compressed, however, and used to cool the nuclear reactor and to pick up heat so that it becomes highly heated just as the combustion gases were heated in the form of FIGURES 1 to 3, and the highly heated compressed air is then employed to operate a turbine or similar rotary engine. In the nuclear reactor as shown in FIGURE 5, air is compressed by the compressor 20 and enters through the nuclear reactor 21' (this will suitably be one of several units) and is discharged through the turbine 22 and the exhaust passages 57. The nuclear reactor suitably has a nuclear reacting mass 66 (fissionable material) which is provided with a series of suitably diverging air channels 67 and with a central passage 68 which receives a control rod 70. The control rod is suitably manipulated in a well known manner. Surrounding the nuclear reactor is a casing 71 in spaced relation to the reactor and a ring 42 is provided at the upstream end of the space 44 for introducing cooling and vaporizing liquid such as water by means of the nozzles 45 forming the jets 46.

As in the other forms, the vaporization of the coolant and vaporizing liquid surrounding the reactor causes the absorption of the latent heat of vaporization, cooling the source of heat and cooling the air and providing increased gas for operation of the turbine. As in the other form, it is therefore possible to avoid introducing excess air for cooling purposes, and avoid doing extra work by the compressor for that purpose.

To summarize, therefore, it will be understood that a suitable coolant liquid is vaporized and in the preferred embodiment a high temperature heat transfer liquid is heated by waste heat mainly from the exhaust gases. This heated cooling and vaporizing liquid is introduced between the outer casing and the internal structure, suitably between the casing and the liner, where it cools the liner by the latent heat of vaporization, generating a large volume of high velocity low temperature gas for cooling the highly heated gas to a safe temperature to protect metal parts. Also the necessity of compressing extra air for cooling the combustion chamber liner and the products of combustion is avoided, the size of the compressor is greatly reduced and efficiency is increased, and the pressure attained in compressing the smaller volume of air is increased. In view of my invention and disclosure, variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. A combustion apparatus for producing large quantities of gases at a desired temperature for driving a gas turbine and comprising an outer generally tubular casing for conveying gases from an upstream entrance to a downstream discharge, an inner generally tubular liner forming an inner combustion chamber for burning fuel and air to produce large volumes of high temperature gases moving downstream, said liner extending longitudinally to said casing and spaced therefrom to form a passage isolated from said combustion gases by said liner, means for spraying into said passage a coolant capable of absorbing large quantities of heat of vaporization for contacting and cooling the liner to heat all the coolant to a gas, said inner liner defined by the combustion chamber and passage terminating within the casing and forming a large area for discharge from said passage, said casing extending longitudinally downstream from the liner to form a mixing chamber at the downstream end of said passage and combustion chamber and directly connected thereto to receive and mix said high temperature gases and said entirely gaseous coolant to produce a mixture at a desired operating temperature, and said casing having means to discharge the mixture to a gas turbine.

2. A combustion apparatus as set forth in claim 1 in combination with a gas turbine having an exhaust gas passage, said casing having a heat exchange jacket therearound for transferring heat to the casing and to said passage with the coolant, a heat exchange unit in heat transfer relation with the exhaust gas passage and said jacket to transfer the heat of the exhaust gases to the coolant in said passage.

3. A combustion apparatus as set forth in claim 1 wherein means are provided to block said passage at the upstream end so that the coolant is the sole fluid discharged into said passage.

References Cited in the file of this patent

UNITED STATES PATENTS

| | | |
|---|---|---|
| 974,216 | Voegeli | Nov. 1, 1910 |
| 1,102,345 | Lemale | July 7, 1914 |
| 1,531,475 | Brandt | Mar. 31, 1925 |
| 2,359,108 | Hoskins | Sept. 26, 1944 |
| 2,586,025 | Godfrey | Feb. 19, 1952 |
| 2,603,064 | Williams | July 15, 1952 |
| 2,656,677 | Peterson | Oct. 27, 1953 |
| 2,718,753 | Bridgeman | Sept. 27, 1955 |
| 2,770,097 | Walker | Nov. 13, 1956 |
| 2,793,497 | Walter | May 28, 1957 |

FOREIGN PATENTS

| | | |
|---|---|---|
| 148,341 | Great Britain | Oct. 10, 1921 |
| 279,197 | Great Britain | Oct. 27, 1927 |
| 283,290 | Great Britain | Jan. 19, 1928 |
| 644,719 | Great Britain | Oct. 18, 1950 |

OTHER REFERENCES

Garraway: abstract of application Serial Number 734,105, published Jan. 1, 1952, 654 O.G. 321.